(12) United States Patent
Hasharoni

(10) Patent No.: US 9,063,313 B1
(45) Date of Patent: Jun. 23, 2015

(54) FIBER COUPLING USING COLLIMATED BEAMS

(75) Inventor: Jacob Hasharoni, Sarigim (IL)

(73) Assignee: COMPASS ELECTRO OPTICAL SYSTEM LTD. (IL)

( * ) Notice: Subject to any disclaimer, the term of this patent is extended or adjusted under 35 U.S.C. 154(b) by 0 days.

(21) Appl. No.: 13/543,347

(22) Filed: Jul. 6, 2012

(51) Int. Cl.
*G02B 6/12* (2006.01)
*G02B 6/43* (2006.01)
*G02B 6/42* (2006.01)

(52) U.S. Cl.
CPC ............... *G02B 6/43* (2013.01); *G02B 6/4249* (2013.01)

(58) Field of Classification Search
CPC ...... G02B 6/32; G02B 6/3644; G02B 6/3652; G02B 6/3672; G02B 6/3692; G02B 6/3696; G02B 6/4202; G02B 6/4228; G02B 6/4249; G02B 6/43
USPC ........... 385/14, 33, 134, 136, 137, 88; 29/592
See application file for complete search history.

(56) References Cited

U.S. PATENT DOCUMENTS

| | | | | |
|---|---|---|---|---|
| 5,633,527 | A * | 5/1997 | Lear | 257/432 |
| 5,857,042 | A * | 1/1999 | Robertson et al. | 385/33 |
| 6,587,618 | B2 * | 7/2003 | Raguin et al. | 385/33 |
| 6,912,091 | B2 * | 6/2005 | Hamanaka et al. | 359/641 |
| 8,090,230 | B1 | 1/2012 | Hasharoni et al. | |
| 2003/0053762 | A1 * | 3/2003 | Cheng et al. | 385/88 |
| 2003/0142909 | A1 * | 7/2003 | Suzuki et al. | 385/33 |
| 2003/0179800 | A1 * | 9/2003 | Uebbing | 372/96 |
| 2004/0126064 | A1 * | 7/2004 | Vandentop et al. | 385/49 |
| 2004/0146253 | A1 * | 7/2004 | Wang et al. | 385/93 |
| 2004/0190851 | A1 * | 9/2004 | Garner et al. | 385/137 |
| 2005/0063643 | A1 * | 3/2005 | Watanabe et al. | 385/33 |
| 2005/0087747 | A1 * | 4/2005 | Yamada et al. | 257/80 |
| 2005/0094999 | A1 * | 5/2005 | Weigert | 398/33 |
| 2006/0022214 | A1 * | 2/2006 | Morgan et al. | 257/99 |
| 2006/0098292 | A1 | 5/2006 | Wong et al. | |
| 2006/0239605 | A1 * | 10/2006 | Palen et al. | 385/14 |
| 2006/0249661 | A1 * | 11/2006 | Ishigami et al. | 250/216 |
| 2007/0267569 | A1 * | 11/2007 | Ueno et al. | 250/216 |
| 2011/0268387 | A1 * | 11/2011 | Popp | 385/33 |
| 2011/0284981 | A1 * | 11/2011 | Chang et al. | 257/432 |

OTHER PUBLICATIONS

Doany et al., "Terabit/sec 48-channel Fiber-coupled Optical Module based on Holey CMOS transceiver IC," IEEE, 978-4673-1965-2/12/, pp. 1499-1504 (2012).
Doany et al., "160-Gb/s Bidirectional Parallel Optical Transceiver Module for Board-Level Interconnects Using a single-chip CMOS IC," IEEE, Electronic Components and Technology Conference, 1-4244-0985-0/07/, pp. 1256-1261(2007).

* cited by examiner

*Primary Examiner* — Peter Radkowski
(74) *Attorney, Agent, or Firm* — Wilmer Cutler Pickering Hale and Dorr LLP

(57) ABSTRACT

An optical interconnect uses large 2-dimensional matrices of optoelectronic chips. The optoelectronic chips are placed directly above the analog circuitry required to drive them and with the microlens array placed on top of the optoelectronic chip. A single microlens array is assembled directly on top of the 2-dimensional optoelectronic chip. The optoelectronic chips may include vertical cavity surface emitting lasers (VCSEL) for signal generation and p-i-n photodiodes for signal detection. A bundle of optical fibers or waveguides with a layout identical to the optoelectronic chips is used for optical data transfer between constituents of the optical communication system.

9 Claims, 6 Drawing Sheets

FIBER COUPLING USING COLLIMATED BEAMS

FIELD OF THE INVENTION

The present invention relates to the field of parallel optical interconnects and, more precisely, to the coupling of light between a matrix of laser sources to a matrix of fibers or to the coupling of light between a matrix of fibers and a matrix of photodetectors.

BACKGROUND OF THE INVENTION

Coupling of light from an array of laser transmitters to a matching array of optical waveguides is crucial for utilization of optical interconnects. Similarly critical is the coupling of light from the waveguide array to a matching array of photo-receivers.

In optical interconnects, each channel is built from a laser transmitter, a photodiode and a waveguide (typically optical fiber) connecting the two. Optical coupling between the elements is carried out using microlens that serve as a light focusing and collecting medium. Facilitation of dense optical interconnects is enabled using a large number of parallel optical channels. Thus, large, two-dimensional, matrices of laser diodes, microlenses and photodetectors are utilized. Given the large optoelectronic arrays, there are two major obstacles relevant to realization of a dense parallel optical interconnect. The first is coupling efficiency and the second optical crosstalk. These problems arise from the size and two-dimensional nature of the matrices; in a typical assembly scheme, the matrix of optical fibers is aligned directly above the optoelectronic matrix with a microlens array in between. Such an arrangement is prone to alignment errors resulting from the size of the matrices and the 6 degrees of freedom associated with each matrix. The key element controlling the degree of alignment errors is the microlens array design and there are several methods which have addressed the coupling efficiency and crosstalk issue of fiber light coupling with large optoelectronic matrices.

Typically, a bi-convex lens would be used for such a task as it would imply usage of a single lens with two optical surfaces. One surface would handle the light collection from either fiber or laser while the other surface focuses the light onto the fiber face or PD aperture. An example of such a lens is given in U.S. Pat. No. 8,090,230 and published US application number 2006/0098292. With such an approach, the alignment tolerances are limited because a single optical element is used.

A different approach, in which the bi-convex lens is converted into a 2-lens relay, is described in reference an article by F. Doany and others from IBM, entitled "160-Gb/s Bidirectional Parallel Optical Transceiver Module for Board-Level Interconnects Using a Single-Chip CMOS IC," from the 2007 Electronic Components and Technology Conference. This fiber coupling method is based on assembly of several one-dimensional optoelectronic arrays (1×12 elements) which are assembled next to each other on top of the Silicon interposer. Thus, an inherent inaccuracy in the laser and photodiode pitch is introduced into the system thereby limiting the size of the microlens array due to accumulation of alignment errors.

The crosstalk problem for large matrices was addressed with a 2-lens relay as described in U.S. Pat. No. 5,857,042. In this approach, the laser sources and first lenses are offset relative to each other. An identical but opposite offset is introduced between the second lens array and photodetector array as well. Any stray light will be focused away from neighboring channels thereby minimizing crosstalk. Such accurate offsets are difficult to achieve in a manufacturing environment making this solution impractical.

BRIEF DESCRIPTION OF THE DRAWINGS

The present invention will be further understood and appreciated from the following detailed description taken in conjunction with the drawings in which.

SUMMARY OF THE INVENTION

The present invention describes a two-lens system which was designed in order to overcome the obstacles described above. In addition, the method described in this approach allows efficient manufacturing of the optical interconnect as highly relaxed alignment tolerances can be achieved.

An important feature of this embodiment is the usage of large, 2D matrices of optoelectronic chips. Unlike previous attempts to realize an optical interconnect using several 1D optoelectronic arrays; the usage of a 2D array has several distinctive advantages regarding the pitch and angular accuracy, ease of assembly and homogeneity of the neighboring elements. These parameters have a direct effect on the overall system performance as the device coupling loss and crosstalk decrease due to the added assembly accuracy.

The lens system is designed for an optical interconnect with a vertical assembly scheme in which the optoelectronic chips are placed directly above the analog circuitry required to drive them and with the microlens array placed on top of the optoelectronic chip. A single microlens array is assembled directly on top of the 2D optoelectronic chip enabling simple and efficient assembly with high lateral and angular accuracy.

The optoelectronic chips in use are vertical cavity surface emitting lasers (VCSEL) for signal generation and p-i-n photodiodes (PD) are utilized for signal detection. These optoelectronic chips are assembled onto a CMOS chip that controls signal generation and detection. A bundle of optical fibers (or waveguides) with a layout identical to the optoelectronic chips is used for optical data transfer between the various constituents of the optical communication system.

DETAILED DESCRIPTION OF THE INVENTION

Figure 1:
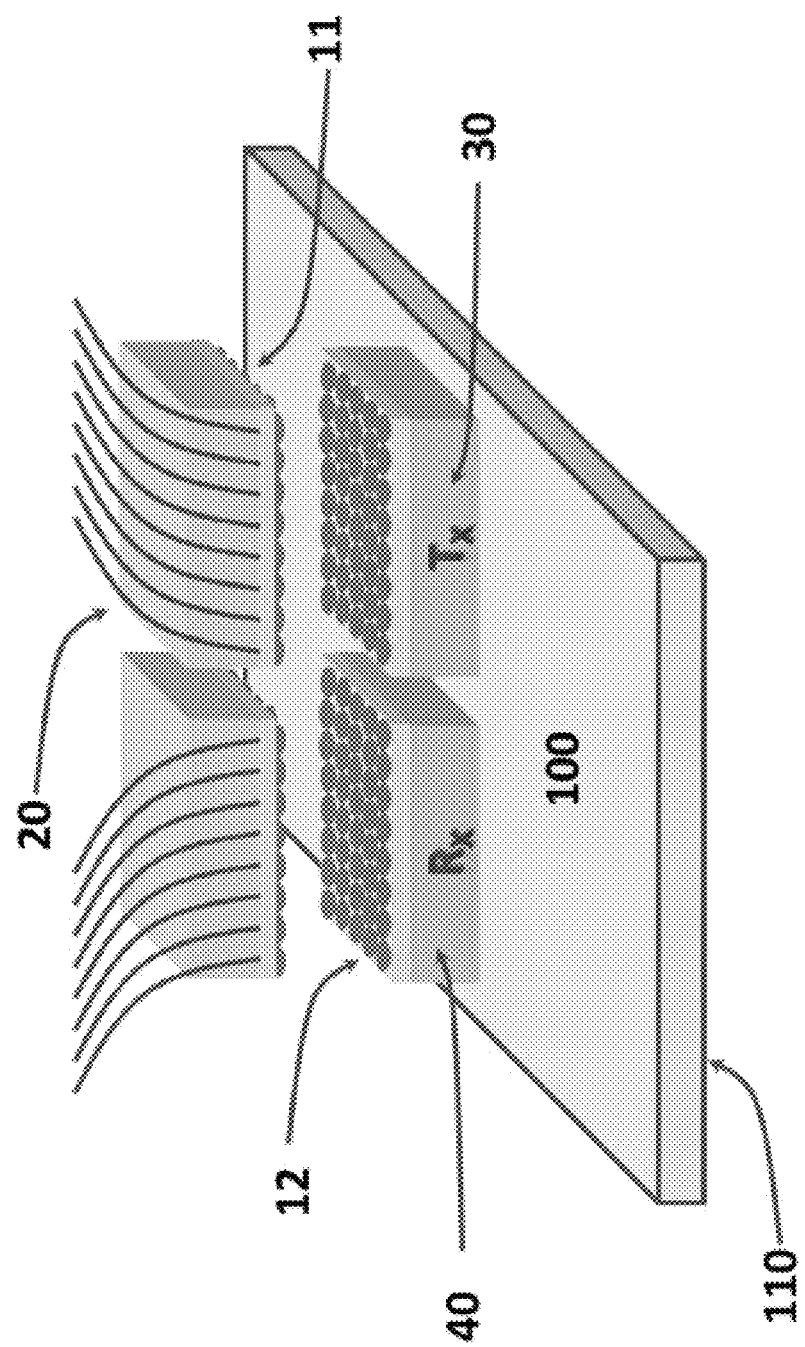
FIG. 1 shows a schematic illustration of a two dimensional optical interconnect according to aspects of the invention.

FIG. 1 provides a schematic illustration of a dense, two dimensional optical interconnect 100 showing a CMOS chip 110 with embedded analog circuitry needed to drive the VCSEL 30 and PD 40 matrices. The optoelectronic chips are also 2D in nature and assembled on the CMOS chip using flipchip bonding. A microlens matrix 12 is assembled directly on top of the optoelectronic chips, also via flipchip bonding. A matrix of optical fibers 20 with a second microlens array 11 is assembled directly above the VCSEL and PD matrices. The number of elements in each matrix can vary; in this illustration, a 5×8 matrix is drawn for sake of simplicity. However, the lens design described in this invention allows for assembly of large matrices with several hundreds of channels, each with high coupling efficiency and minimal (<30 dB) of crosstalk.

Figure 2:
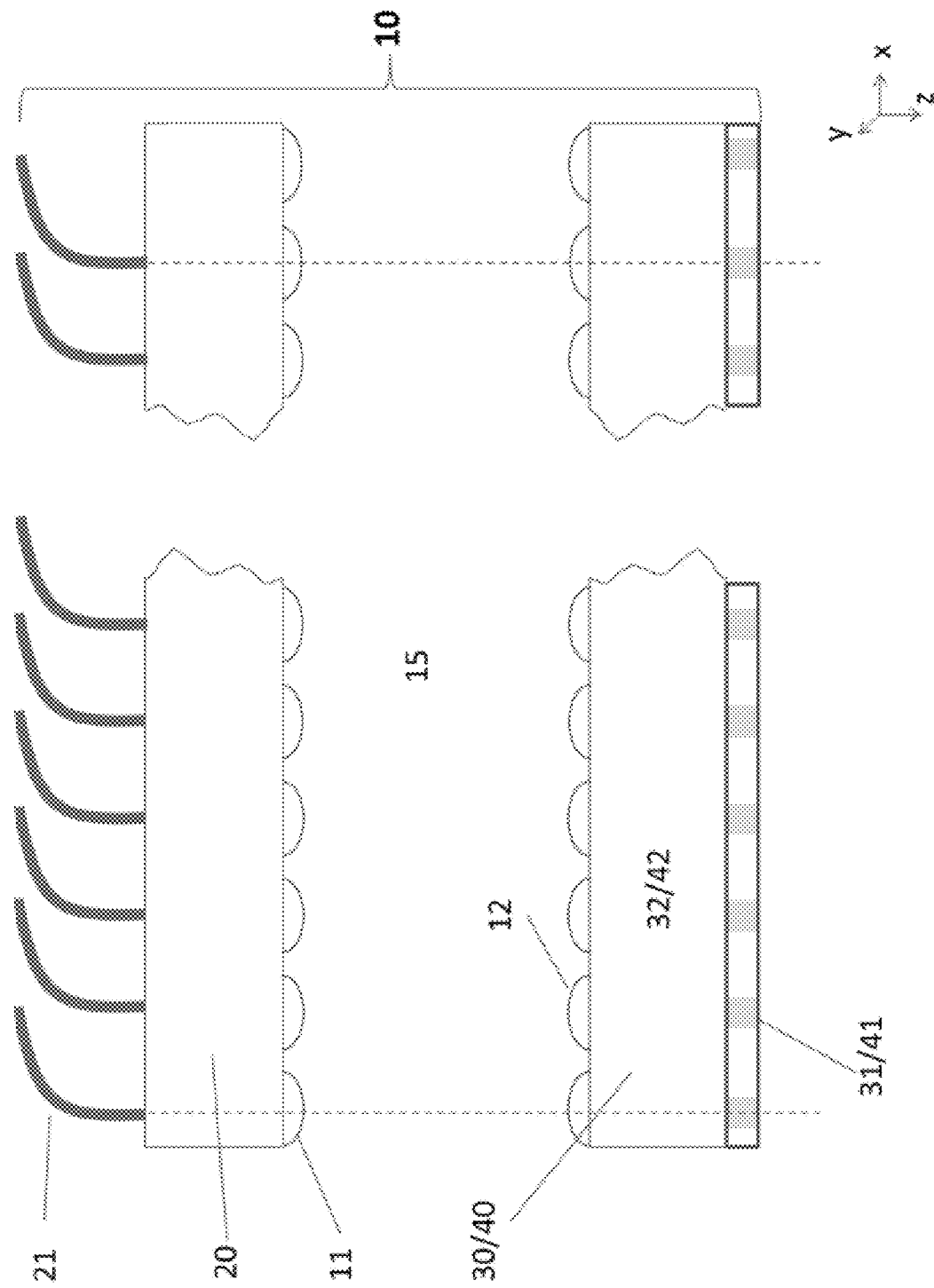
FIG. 2 shows a cross section of a two dimensional matrix according to aspects of the invention.

A cross section of the two dimensional matrix is shown in FIG. 2 with the dual lens system 10 serving to couple light to and from a matrix of fibers 20 and a matrix of lasers 30 or photodetectors 40. The illustration in FIG. 2 shows a one-dimensional cross section of such a device which could have any layout of its elements, for example a 12×14 matrix of elements. In this arrangement, each active element 31/41 (laser or photodiode) is located on the optical axis (Z) of a fiber 21 within the matrix. The dual lens system 10 is made up from an equal-size array of microlenses where one microlens array 11 is assembled on top of the fiber bundle array 20 and the second microlens array 12 is assembled on top of either the laser array 30 or the photodiode (PD) array 40. Thus, the lens system 10 is designed to operate in two reversed and unequal modes: coupling light from a laser diode 31 to fiber 21, shown in FIG. 3; and coupling light from a fiber 21 to PD 41, shown in FIG. 4. In both cases light is collimated by the first lens and directed through the free space 15 between the lenses onto the face of the second lens which focuses light onto the face of the receiving element.

In an exemplary embodiment, the fiber matrix 20 is conveniently constructed from several ribbons of 12 fibers each, as custom in the industry. However, any fiber array size can be used as long as all of the other elements have the same dimensions. The fiber pitch in this exemplary embodiment is 0.25 mm and the fibers are housed in a mechanical housing. The fiber packing within the bundle is arbitrary; in this exemplary embodiment, a rectangular arrangement of the fibers is used. The fibers are multimode 50/125 µm; however, other fiber types can be used by changing the lens design to match the fiber numerical aperture.

The matrix of lasers 30 is arranged in an identical layout as the fiber matrix 20. A matrix of VCSEL diodes is preferred for this embodiment as it allows growing the laser diodes in matrix format at the wafer level already. Every element in the matrix 31 is an InGaAs device on a GaAs substrate 32. The reflector arrangement in the VCSEL cavity is altered such that the laser is a back-emitting device with light coming out from the back surface of the GaAs substrate 32. The lasing wavelength is set at 1000 nm where GaAs does not absorb light. In this embodiment, the back emitting nature and the wavelength red-shift originate from the two-dimensional nature of the optical matrix 30 that leads to usage of flipchip bonding. Ordinary front-emitting VCSEL matrices are not used since a CMOS chip 110 is located directly below the optoelectronic chips.

The matrix of photodiodes 40 is also arranged using the same layout as the fiber matrix. Each element in the matrix is an InGaAs device on an InP substrate 42. Similarly to what is described above for the lasers, the PD cavity is altered to enable illumination from the back surface. That is, the PD cavity is arranged to receive illumination from the back surface. At a wavelength of 1000 nm, the InP substrate 42 is transparent as well. The PD aperture is 52 µm in an exemplary embodiment, large enough to allow alignment tolerances when using a multimode 50/125 µm fiber as described in the rest of this application.

The optical interconnect described in this invention is based on vertical integration of several large, two-dimensional optical matrices as depicted in FIGS. 1 and 2. For each matrix, there are 6 degrees of freedom that the matrices can move or rotate around – 3 translational and 3 rotational whose alignment accuracy is dependent on the assembly method. In this embodiment, assembly is based on flipchip technology with an accuracy of 3-5 µm. Sources of alignment uncertainty are the assembly of lens array 12 on the laser/PD substrate 32/42 or from assembly of the lens array 11 on the fiber bundle 20. In addition, the fiber 21 pitch error in bundle 20 can be as high as 2 µm. These errors sum up to an uncertainty of:

$$\sqrt{5^2 + 5^2 + 2^2} \cong 7\text{-}8\,\mu m.$$

At the same time, tilt angles of the lens and fibers, which can be as high as 1-2°, are present as well.

The dual lens 10 design is specific to enable high coupling efficiency with losses less than 1 dB and cross talk less than −20 dB given the alignment uncertainty described above. This task is enabled by using collimated light between the two lenses in the free space 15 since a collimated beam is less sensitive to misalignment by its nature. The performance of the dual lens system over the entire n×m matrix is homogeneous in both coupling efficiency and crosstalk. This is enabled by the 2D nature of the optical matrices which, unlike a collection of 1D arrays, maintain a constant pitch error between the discrete elements (lasers, PDs, lenses and fibers) and a single angular misalignment for the entire matrix. These features minimize the assembly errors while allowing achieving relaxed alignment tolerances.

The coupling of light into both, PD 41 and fiber 21 apertures is designed to occupy a small radius thereby leaving space for alignment errors. The lens system 10 is designed also to maintain an under-filled launch condition on the fiber face when coupling light from the laser 31 into the fiber 21 in order to excite only low orders modes in the fiber.

A feature of some embodiments is the usage of a single set of dual lenses 11 and 12 to carry out these tasks, even though the two light coupling schemes are not symmetrical due to the different refractive indices experienced by the light beam as it propagates in either direction, from VCSEL to fiber and from fiber to PD.

The dual lens design is based on two elements where one lens is assembled directly on the substrate of either laser or PD 32/42 and the second lens is assembled directly on the fiber bundle matrix 20. In some embodiments, since both laser and PD are grown on III-V substrate, the lens 12 is made from a III-V material as well to minimize the differences in the coefficient of thermal expansion. In some embodiments, GaP is used for the lens material as it is transparent at the wavelength of interest and has a refractive index very similar to both GaAs and InP. A low-index lens from Pyrex or a similar glass is used to couple light to and from the fiber matrix.

Lens design follows two performance criteria in some embodiments: (i) at the fiber face 21 use an image height (H') considerably smaller than the core radius and an incidence angle (I') considerably smaller than the fiber NA (±11.5°). Therefore, set H'<10.0 µm and I'<8.5°; (ii) at the photodiode aperture 41 use an image height considerably smaller than the aperture radius; therefore set H"<15.0 µm. One specific embodiment of this invention is that a single set of lenses is used for both optical relays. Thus, the dual lens system 10 is designed such that a single magnification value is used in both directions where $m_2 = m_1^{-1}$.

Figure 3:
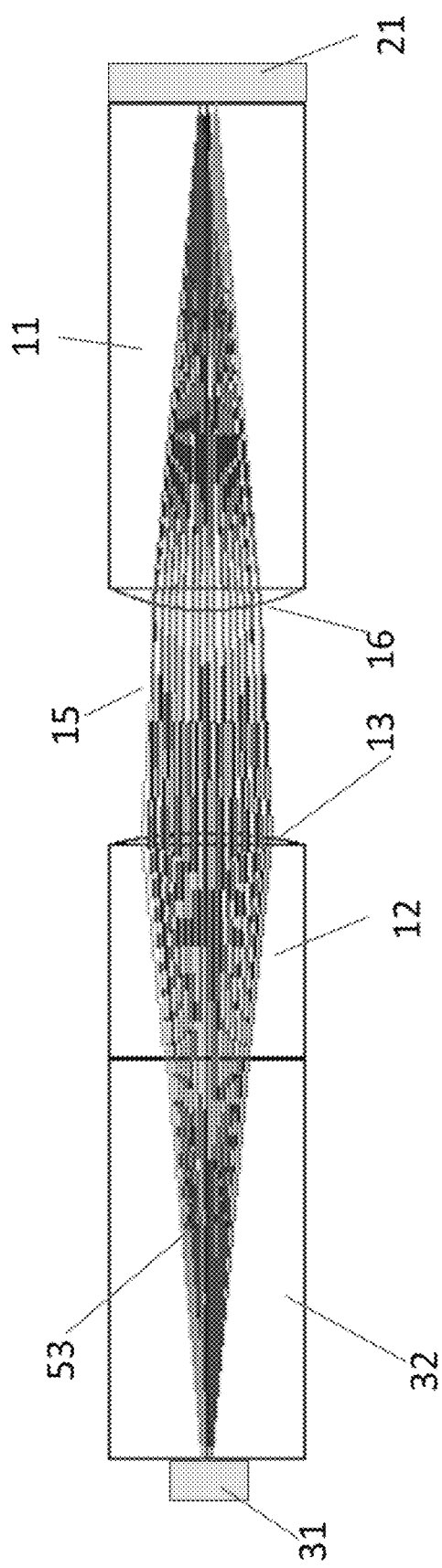
FIG. 3 illustrates an optical relay of coupling light from a laser diode to a fiber according to aspects of the invention.

The optical coupling of a single VCSEL into its corresponding fiber in the matrix 20 is shown in FIG. 3. Light propagation from the laser diode 31 is shown for three fields located in the laser aperture along the y-axis at −0.005, 0.0 and 0.005 mm. A ray trace of the optical signal 53 propagates through the GaAs substrate 32 and through the high index, GaP lens 12 with a signal broadening determined by the laser divergence angle. The thickness of the GaAs substrate is optimized such that the illumination cone incident on the optical surface 13 of lens 12 is less than the clear aperture of the lens. This prevents stray light from propagating to adjacent channels thereby minimizing crosstalk. With a pitch of 0.25 mm, and given typical manufacturing tolerances of microlenses, the clear aperture is about 0.22 mm. The GaAs substrate thickness is set at 0.535 mm and the GaP lens thickness is 0.3 mm resulting in a high-index optical path of 0.535×3.3+0.3×3.02=2.67 mm. The overall optical path enables full utilization of the optical surface 13 while eliminating scattering from the lens edges which could lead to cross talk. The optical signal 53 incident on optical surface 13 is collimated and continues to propagate through free space 15. The GaP radius of curvature is 0.49 mm with a conic constant of −0.525 resulting in lens sag 14 of 16 µm. On optical surface 16 the optical signal is focused directed to the fiber 21 through a glass lens 11 whose thickness and radius of curvature are optimized to maintain the coupling criteria described above. In this embodiment, the lens thickness 11 is set to 0.67 mm with a lens radius of 0.268 mm and zero conic constant.

Figure 5:
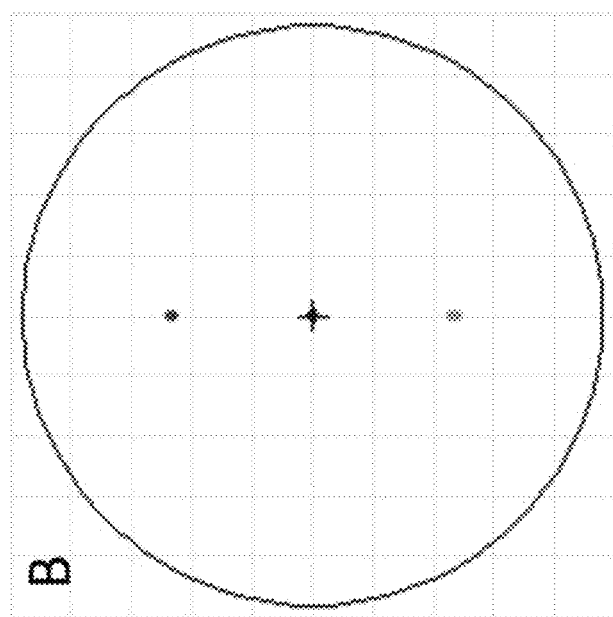
FIGS. 5a-b show a footprint diagram of the fiber face and the photodiode aperture, respectively, showing spots of the three field spots used for ray trace according to aspects of the invention.
Figure 5:
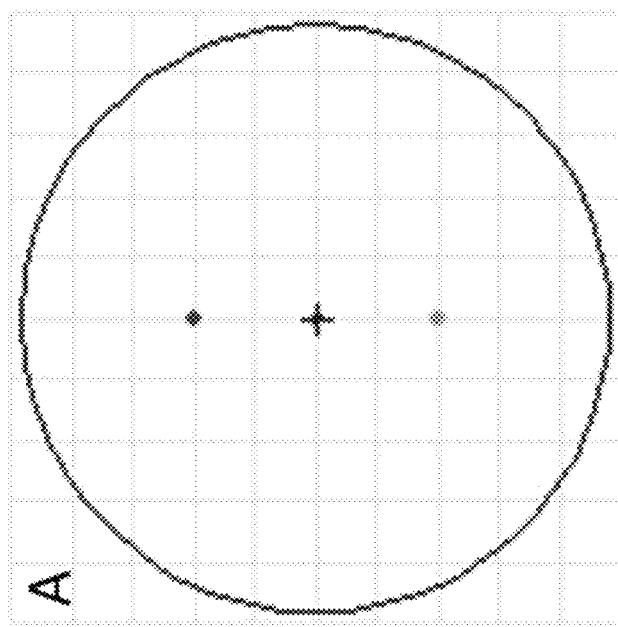

FIG. 5*a* is a 'footprint' diagram of the fiber 21 face showing the spots of the three field spots used for the ray trace. The two outer field spots span a radius of 10.56 µm out of the fiber core radius of 25 µm. The magnification is thus 10.56/5=×2.11 and an under-filled launch condition is maintained, as required.

Figure 4:
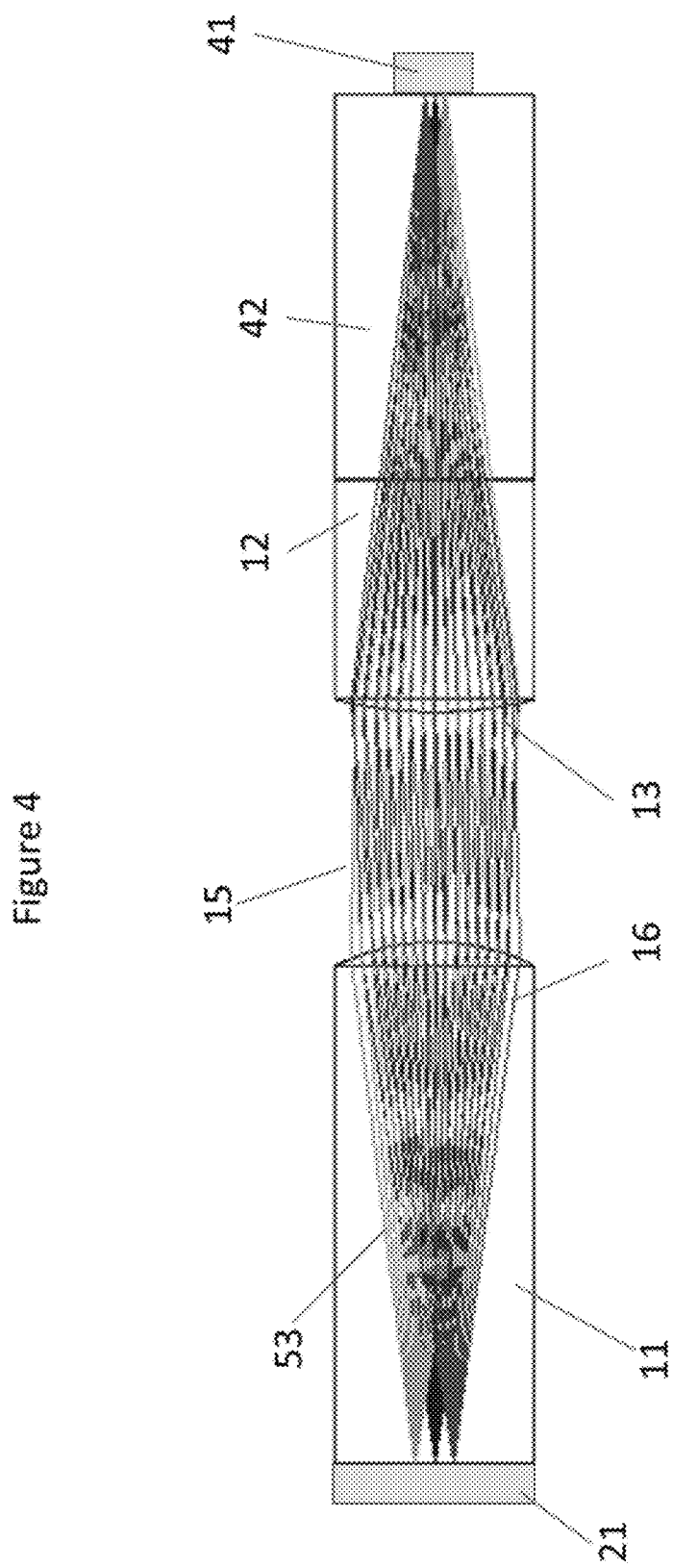
FIG. 4 illustrates an optical relay of coupling light from a fiber to a photodiode according to aspects of the invention.

Similar to the description given above of light coupling from the VCSEL to fiber, FIG. 4 illustrates the reversed optical relay of coupling light from a fiber 21 to the aperture of the PD 41. Light propagation from the fiber 21 is shown for three fields located in the 50 µm fiber aperture along the y-axis at −0.025, 0.0 and 0.025 mm. A ray trace of the optical signal 53 propagates through the Pyrex lens 11 and diverges according to the ~0.2 NA of the fiber. At optical surface 16 the light is collimated and propagates through free space 15. The lens thickness and radius of curvature are identical to those described for the opposite relay. The collimated signal is focused on surface 13 of the GaP lens 12 and the signal propagates through the 0.3 mm GaP lens and the InP substrate of the PD whose thickness is set at 0.5 mm. The optical path length for this relay is thus: 0.3×3.02+0.5×3.2=2.51 mm, slightly less than in the previous optical relay.

FIG. 5*b* is a 'footprint' diagram of the PD aperture 41 showing the spots of the three field spots used for the ray trace. The two outer field spots span a radius of ±12.5 µm out of the PD aperture of 25 µm. The magnification is thus 12.5/25=×0.5~1/2.11 indicating that the same magnification is used in both relays, as designed.

Figure 6:
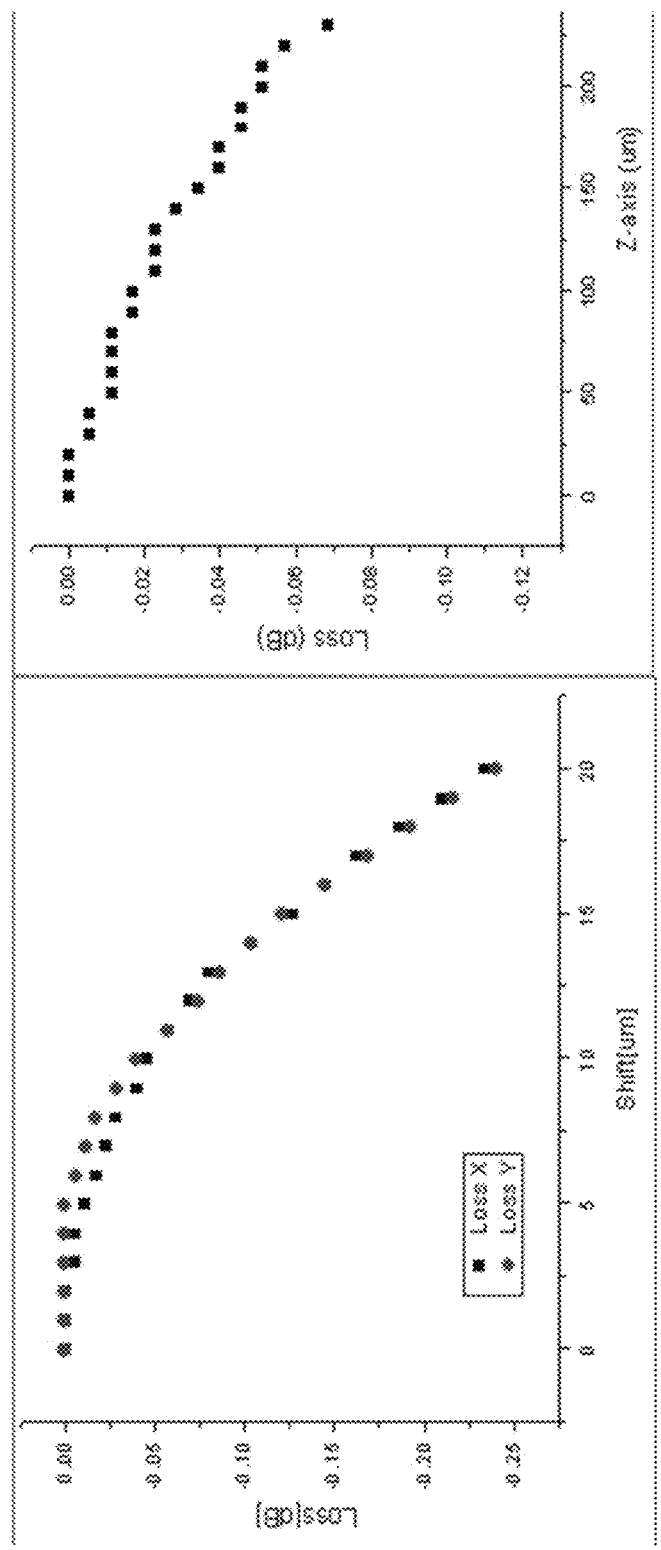
FIG. 6 shows graphs of the optical loss signal as a function of shifting the lens according to aspects of the invention.

Optical alignment of the fiber bundle 20 above either the VCSEL 30 or PD 40 matrices with the initial assembly errors of the lens arrays 12 and 11 is enabled by the collimated beams running between the two lenses in free space 15. This space is set at 0.3 mm but can be extended up to ~1.5 mm as the optical signal is highly collimated. This feature of the invention allows for relaxed alignment tolerances on the lateral x,y axes as well. An example of this alignment tolerance is illustrated in FIG. 6 where the optical loss signal is monitored as a function of shifting the lens 11 on either x, y or z axes. It can be appreciated that the loss is below 0.5 dB for a 20 µm lateral shift.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

What is claimed is:

1. An optical interconnect apparatus comprising:
an integrated circuit chip;
a transmitting optoelectronic chip positioned on the integrated circuit chip, the transmitting optoelectronic chip including a first substrate and a 2-dimensional optoelectronic array of back-emitting laser diodes positioned on an underside of the first substrate for transmitting optical signals through the first substrate;
a receiving optoelectronic chip positioned on the integrated circuit chip adjacent the transmitting optoelectronic chip, the receiving optoelectronic chip including a second substrate and a 2-dimensional optoelectronic array of back-illuminated photodiodes positioned on an underside of the second substrate for receiving optical signals through the second substrate;
a first microlens array positioned on the transmitting optoelectronic chip, the first microlens array including a first plurality of microlenses each adhering directly to a top side of the first substrate opposite the array of laser diodes;
a second microlens array spaced above and optically coupled to the first microlens array;
a first bundle of optical fibers coupled to the second microlens array;
a third microlens array positioned on the receiving optoelectronic chip, the third microlens array including a second plurality of microlenses each adhering directly to a top side of the second substrate opposite the array of photodiodes;
a fourth microlens array spaced above and optically coupled to the third microlens array; and
a second bundle of optical fibers coupled to the fourth microlens array;
wherein the integrated circuit chip includes circuitry for controlling the transmitting and receiving optoelectronic chips;
wherein the first microlens array and the third microlens array have the same optical properties; and
wherein the first substrate has a thickness related to the optical properties of the first microlens array such that substantially all of the optical surface of each of the first plurality of microlenses is included in an optical path of the optical signals transmitted from the 2-dimensional optoelectronic array of laser diodes.

2. The optical interconnect apparatus of claim 1, wherein the transmitting optoelectronic chip includes a VCSEL chip including a 2-dimensional array of vertical cavity surface emitting lasers.

3. The optical interconnect apparatus of claim 1, wherein the receiving optoelectronic chip includes a p-i-n photodiode chip.

4. The optical interconnect apparatus of claim 1, wherein the first microlens array includes III-IV material.

5. The optical interconnect apparatus of claim 4, wherein the first microlens array includes GaP lenses.

6. The optical interconnect apparatus of claim 4, wherein the second microlens array includes Pyrex.

7. The optical interconnect apparatus of claim 1, wherein at least one of the transmitting and receiving optoelectronic chips is flip-chip bonded to the integrated circuit chip.

8. The optical interconnect apparatus of claim 1, wherein the optoelectronic array on each optoelectronic chip is positioned along an optical axis of the corresponding bundle of optical fibers.

9. The optical interconnect apparatus of claim 1, wherein the first microlens array and the second microlens array have inverse magnification values.

* * * * *